Aug. 27, 1957     E. J. LACHANCE     2,804,234
BOTTLE CARRIER
Filed Feb. 27, 1957
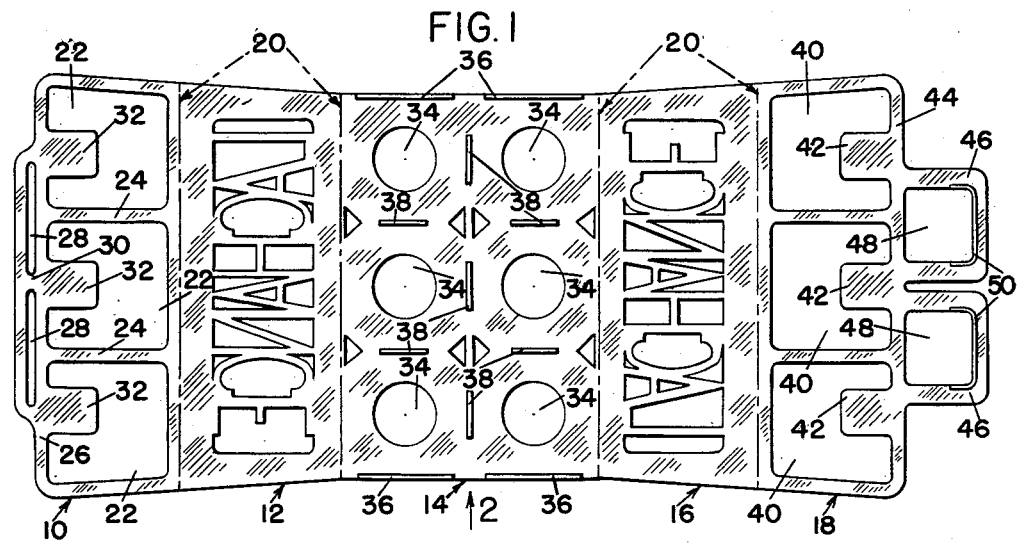
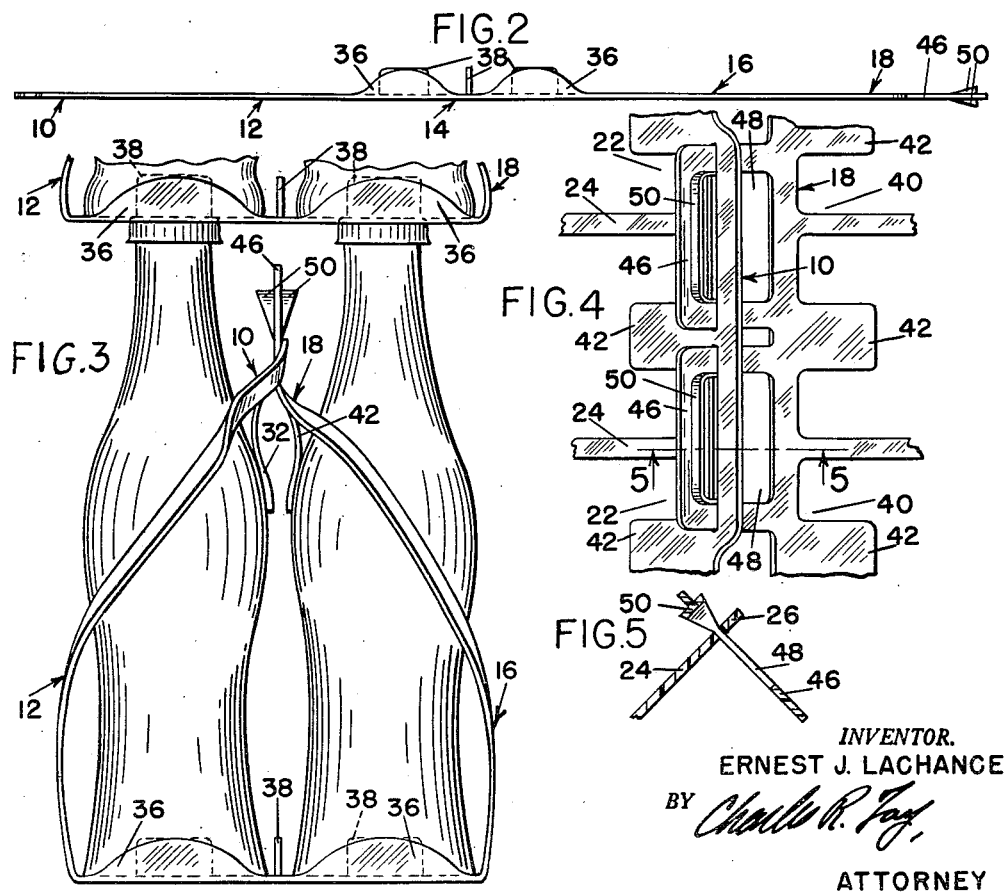
INVENTOR.
ERNEST J. LACHANCE
BY Charles R. Fay
ATTORNEY

United States Patent Office 2,804,234
Patented Aug. 27, 1957

2,804,234

BOTTLE CARRIER

Ernest J. Lachance, Leominster, Mass.

Application February 27, 1957, Serial No. 642,717

2 Claims. (Cl. 220—116)

This invention relates to a one-piece molded plastic bottle carrier using a flexible, resilient, tough plastic material in the nature of poly-ethylene, and the principal object of the invention resides in the provision of a strong, long-lasting bottle carrier of the nature described so that the same may be used many times in selling and transporting bottles sold in great quantities and which are returned to the retailer for refilling at the bottling plant, etc. The usual prior art cardboard bottle carrier lasts on an average of four such trips, whereas the plastic carrier of the present invention lasts up to 100 trips and this shows the economy involved in the provision of the present invention over the prior art.

Further advantages of the invention reside in the provision of the molded one-piece bottle carrier which comprises a series of five panels originally molded in a flat sheet, there being a center panel which forms the bottom of the carrier, a pair of side panels and a pair of top panels, the top panels being the outermost panels, one of whch is provided with a handle and the other with a slot through which the handle extends, the handle having thickened portions to prevent accidental release thereof from the slot so that the carrier will stay in operative position unless the handle is deliberately disengaged; and the provision of a bottle carrier as above stated including integral holding tabs in the top member and positioning tabs in the bottom member, together with apertures in the bottom member for admitting the necks or lips of bottles in a lower stacked carrier, so that the bottles are actually stacked directly on those below.

Other objects and advantages of the invention will appear hereinafter.

Reference is to be had to the accompanying drawings, in which:

Fig. 1 is a plan view of the bottle carrier as it is molded;

Fig. 2 is an edge view thereof, looking in the direction of arrow 2 in Fig. 1;

Fig. 3 is an end elevational view showing the bottle carrier in operative position and in stacked relation;

Fig. 4 is a detail view illustrating the handle construction; and

Fig. 5 is a section on line 5—5 of Fig. 4.

The bottle carrier of the present invention is molded in one piece in an injection molding die, and it is made of a flexible but strong resilient material in the nature of polyethylene.

The carrier comprises five panels, all of which are joined, but are partially separated by score lines, and these five panels are indicated at 10, 12, 14, 16 and 18. Panels 10 and 18 are similar but reversed with respect to each other. Panels 12 and 16 are just alike but reversed, and panel 14 forms the bottom of the container upon which the bottoms of the bottles will rest. The score lines are indicated by the reference numeral 20 in each case.

Panel 10 is formed in the nature of an open frame providing three separate bottle-admitting apertures 22, each aperture being separated from the next by means of a cross member 24 which not only helps to separate the bottles but also strengthens the frame. The frame is formed with an outer longitudinal member 26 provided with a pair of elongated slots 28 adjacent the edge thereof in a widened area 30. Member 26 also supports an integral substantial tab 32 in each aperture 22 and these tabs serve to engage the necks of the bottles when they are held in the carrier as will be explained hereinafter.

Panels 12 and 16 may be open frames also and they form the upright sides of the carrier when in bottle-carrying condition as illustrated in Fig. 3. These panels merely serve to connect panels 10 or 18 with respect to the edges of the bottom panels 14 to support the latter.

The bottom panel 14 is provided with six round apertures as at 34 and these apertures receive the caps or necks of the bottles held in a lower carrier when the carriers are stacked one on the other, so that in a stack of bottles held in the new carriers, the bottles support each other directly vertically in a column and not through the intermediary of the carrier itself.

At each end portion of panel 14, there are provided a pair of upstanding tabs 36 which serve to aid in preventing the end bottles from sliding out endwise of the carrier and in between the respective apertures 34 there are provided a series of upstanding tabs 38 which separate the bottles at their lower portions.

The panel 18 is an open frame similar to that at 10 and is provided with similar apertures 40 and tabs 42 but in this case the longitudinal frame member at the outside edge as at 44 is provided with a pair of outstanding members 46 which are apertured as at 48 to form fingerholds, and these are adapted to be thrust through slots 28 in order to connect the panels 10 and 18 in the carrying condition of the device.

At the outer edges of the carrying members 46, there are provided laterally extending tapering thickened portions 50 which are also thrust through slots 28 and serve as locking members to hold the carrier in its operative condition.

As shown in Fig. 3, the panels 12 and 16 are placed substantially vertically and the panels 10 and 18 are brought inwardly and connected together by means of the latching and carrying members 46 with the members 50 extending through slots 28. The bottles may then be thrust downwardly through apertures 22 and 40 and this action will force the tabs 32 and 42 inwardly to a position where as shown they resiliently bear upon the bottles and aid in positioning the same as well as preventing the bottles from noisily jostling each other.

The bottle carrier of the present invention will be seen to be made very inexpensively but one of its main advantages is that it is extremely long-lasting. The molded plastic of which it is made is strong and durable and not affected by moisture, and the new carrier will outlast card-board cartons to a very great degree. At the same time, the material of the carrier is inherently resilient and will cause the bottles to be carried in a quieter manner while allowing the carrier with bottles therein to be stacked as above described with a lower bottle directly carrying those in line above. The carriers themselves may be shipped flat as illustrated in Figs. 1 and 2 and are easily connected and disconnected without damage and without tearing in order to set them up or to lay them flat for further transportation or storage.

Having thus described my invention and the advantages thereof, I do not wish to be limited to the details herein disclosed, otherwise than as set forth in the claims, but what I claim is:

1. A one-piece molded plastic bottle carrier of flexible, resilient plastic material comprising a substantially flat sheet including a plurality of consecutively joined panels adapted to be swung to relatively inclined relationship to provide a bottom panel member, a pair of upright panel side members and a pair of panel top members, the latter being the outermost panels on the sheet, a carrying handle on one top member at the edge thereof, said handle being apertured, the other top member having a slot to receive the handle and hold the top members together, an integral enlargement on the handle to tend to prevent accidental release of the handle from the said other top member, both said top members being apertured to receive bottles therethrough for disposition of the bottles on the bottom member with the necks of the bottles extending through the apertures, and integral tabs on the bottom member arranged to space and separate the bottles, said tabs being arranged at angles to each other to form bottle-receiving squares, said bottom member being apertured at the center of each square to receive the necks of bottles in a lower, stacked bottle carrier.

2. A one-piece molded plastic bottle carrier of flexible, resilient plastic material comprising a substantially flat sheet including a plurality of panels adapted to be swung to relatively inclined relationship to provide a bottom panel member, a pair of panel side members, and a pair of panel top members, a carrying handle on one top member at the edge thereof, the other top member having a slot to receive the handle and hold the top member together, both said top members being apertured to receive bottles therethrough for disposition of the bottles on the bottom member with the necks of the bottles extending through the apertures, and integral tabs on the bottom member arranged to space and separate the bottles, there being a plurality of apertures in each top member, and a free-ended resilient semi-stiff tab for each top member aperture, each tab being integral with the top member and extending into its aperture to engage the neck of a bottle therein to aid in holding the bottles in place.

References Cited in the file of this patent

UNITED STATES PATENTS

| | | |
|---|---|---|
| 1,967,621 | Keith | July 24, 1934 |
| 2,298,191 | Boh | Oct. 6, 1942 |
| 2,365,914 | Stigler | Dec. 26, 1944 |
| 2,375,631 | De Villard | May 8, 1945 |
| 2,431,713 | Stigler | Dec. 2, 1947 |
| 2,491,149 | Arneson | Dec. 13, 1949 |
| 2,522,950 | Keith | Sept. 19, 1950 |